United States Patent
Compton et al.

(10) Patent No.: US 7,674,648 B2
(45) Date of Patent: Mar. 9, 2010

(54) EXTENDED DYNAMIC RANGE USING VARIABLE SENSITIVITY PIXELS

(75) Inventors: John T. Compton, LeRoy, NY (US); R. Michael Guidash, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/689,072

(22) Filed: Mar. 21, 2007

(65) Prior Publication Data

US 2008/0231727 A1    Sep. 25, 2008

(51) Int. Cl.
*H01L 21/00* (2006.01)
(52) U.S. Cl. ..................................... 438/59
(58) Field of Classification Search ......... 438/103–108, 438/238, 59–60, 618, 622–623, 629, 125–128, 438/584, 597, 637, 197–200, 48, 579; 257/737–739
See application file for complete search history.

(56) References Cited

U.S. PATENT DOCUMENTS

| 6,852,591 B2 * | 2/2005 | Rhodes ....................... 438/244 |
| 6,927,090 B2 * | 8/2005 | Rhodes ....................... 438/59 |
| 2003/0011694 A1 | 1/2003 | Dierickx |
| 2003/0020100 A1 * | 1/2003 | Guidash ....................... 257/222 |
| 2005/0224843 A1 | 10/2005 | Boemler |
| 2006/0119720 A1 | 6/2006 | Hong |
| 2006/0128087 A1 * | 6/2006 | Bamji et al. ................ 438/199 |

FOREIGN PATENT DOCUMENTS

| EP | 1 223 746 | 7/2002 |
| JP | 2003-134396 | 5/2003 |
| WO | 99/62244 | 12/1999 |
| WO | 2006/124592 | 11/2006 |
| WO | 2006/130518 | 12/2006 |

* cited by examiner

*Primary Examiner*—Charles D Garber
*Assistant Examiner*—Andre' C Stevenson
(74) *Attorney, Agent, or Firm*—Peyton C. Watkins; Nancy R. Simon

(57) ABSTRACT

A method for reading out an image sensor, the method includes the steps of integrating charge in a photodetector with the photodetector at a first capacitance; reading the resulting signal level at a first time with the photodetector at the first capacitance; changing the photodetector capacitance to a second capacitance; and reading the signal level associated with the photodetector at the second capacitance.

47 Claims, 5 Drawing Sheets

EXTENDED DYNAMIC RANGE USING VARIABLE SENSITIVITY PIXELS

FIELD OF THE INVENTION

The invention relates generally to the field of image sensors and, more particularly, to increasing the dynamic range of image sensors using variable charge-to-voltage conversion capability.

BACKGROUND OF THE INVENTION

Currently, image sensors have a predetermined dynamic range for capturing images. Some scenes require a large capture dynamic range that may exceed the capability of the image sensor. In this case, the captured scene may not be faithfully represented. Therefore, increasing the dynamic range of image sensors in addition to the normal mode of operation is desirable.

The present invention overcomes the shortcomings of the prior art by providing an image sensor with variable sensitivity to convert captured photoelectron charge into a voltage.

SUMMARY OF THE INVENTION

The present invention is directed to overcoming one or more of the problems set forth above. Briefly summarized, according to one aspect of the present invention, the invention resides in a method for reading out an image sensor, the method comprising the steps of integrating charge in a photodetector with the photodetector at a first capacitance; reading the resulting signal level at a first time with the photodetector at the first capacitance; changing the photodetector capacitance to a second capacitance; and reading the signal level associated with the photodetector at the second capacitance.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of extended dynamic range by doing multiple transfer and sample operations and increasing the floating diffusion capacitance by connecting additional floating diffusions after each transfer and sample operation.

DETAILED DESCRIPTION OF THE INVENTION

Figure 1:
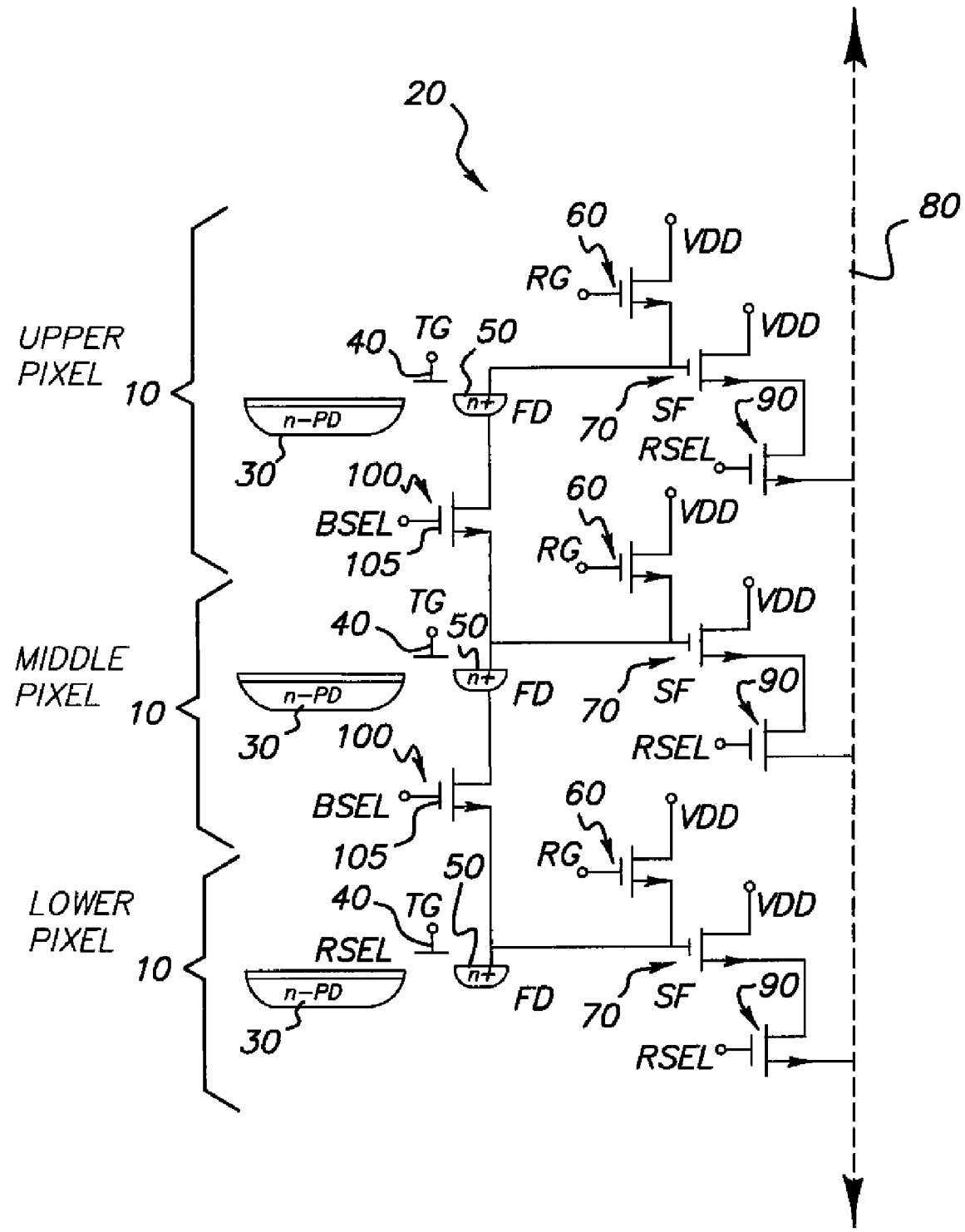
FIG. 1 is a schematic diagram of one embodiment of the present invention.

Referring to FIG. 1, there is shown a schematic diagram (five transistor pixel or 5T pixel) of three pixels 10 of the image sensor 20 of the present invention. Each pixel 10 includes a photosensitive region 30, preferably a pinned photodiode, that collects charge in response to incident light. A transfer gate 40 transfers the charge to a charge-to-voltage conversion mechanism 50, preferably a floating diffusion. It is noted that the floating diffusions 50 of each pixel 10 are electrically connected together as will be discussed in detail hereinbelow. A reset transistor 60 resets the floating diffusion 50 to a predetermined voltage. An amplifier 70, preferably a source follower, senses and buffers the signal from the floating diffusion 50 for readout on an output bus 80. A row select transistor 90 selects the particular row for readout.

A bin select transistor 100 having a gate 105 is pulsed to combine charge on the floating diffusions 50. Although three floating diffusions 50 are shown as combinable in FIG. 1, the number of floating diffusions 50 that are combined are design choices and any desired number of floating diffusions 50 are combinable. The sharing of floating diffusions 50 provides the ability to change the capacitance of the floating diffusions 50 depending on the number of floating diffusions 50 that are combined.

In the above embodiments, the signal from the photodiodes 30 is read out in the following manner. To read out the photodiode 30 of the middle pixel in FIG. 1, for example, the middle readout structures (RG 60, SF 70, and RSEL transistor 90) are employed, but the floating diffusions 50 from all three rows are shared by turning on the two BSEL transistors 100. The three floating diffusions 50 are reset using the RG transistor 60, and the reset level is sampled in a sampling circuit (not shown and well known in the art). Next, the upper and lower floating diffusions 50 are disconnected by turning off the two BSEL transistors 100, and the resulting reset level of the middle floating diffusion 50 is sampled. Charge is transferred from the middle photodiode 30 into the middle floating diffusion 50 by operating the middle TG gate 40. The resulting signal is sampled. Note that the capacitance of the middle floating diffusion 50 may be insufficient by itself to hold all the accumulated charge in the photodiode 30; in this case, the charge will be shared between the photodiode 30 and the floating diffusion 50, and the sampled signal will reflect a non-linearity as a consequence of this charge sharing. After this third sample is taken (two reset samples and a first signal sample), all three floating diffusions 50 are reconnected by means of the two BSEL transistors 100; when this happens, any signal charge on the middle floating diffusion 50 will spread out over the network of three floating diffusions 50. The middle TG gate 40 is operated again to move any remaining charge from the middle photodiode 30 into the three floating diffusions 50, and the resulting signal is sampled. The four samples captured, reset for the three connected floating diffusions 50, reset for one floating diffusion 50, signal on one floating diffusion 50, and signal on three connected floating diffusions 50, provide two fully correlated results as follows: three floating diffusions correlated signal=three floating diffusion signal−three floating diffusion reset; one floating diffusion correlated signal=one floating diffusion signal−one floating diffusion reset.

Figure 2:
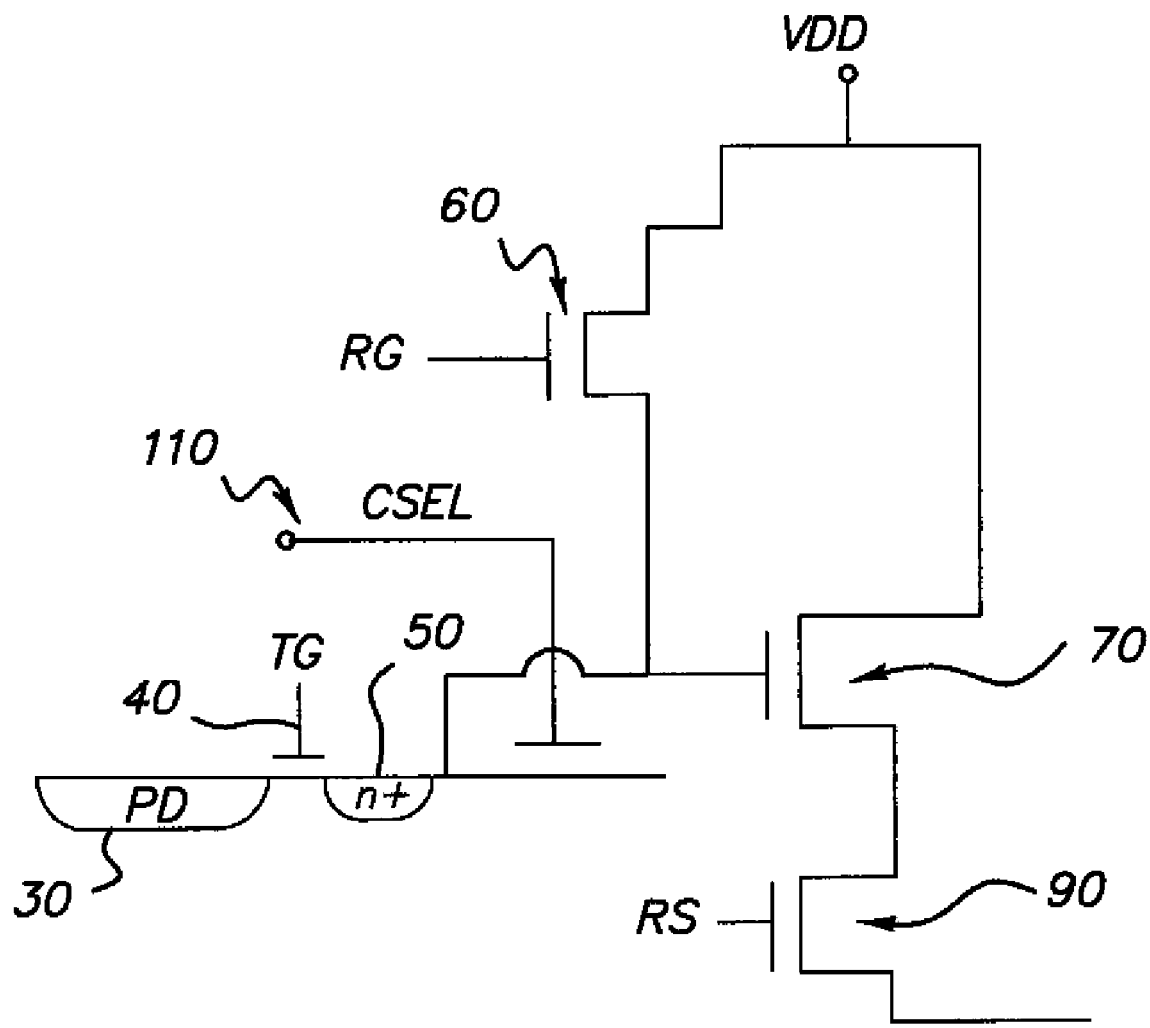
FIG. 2 is a schematic diagram of a second embodiment of the present invention.

Referring to FIG. 2, a four transistor (4T) embodiment is shown. All of the transistors function the same except the BSEL is deleted. In order to change the capacitance of floating diffusion 50, a gate (CSEL) 110 is added. This gate 110 is pulsed in order to change the capacitance.

In the 4T embodiment, the signal from the photodiodes is read out in the following manner. The CSEL gate 110 is operated to provide a smaller floating diffusion capacitance, the floating diffusion 50 is reset using the RG transistor 60, and the reset level is sampled in a sampling circuit (not shown and well known in the art). Next, the CSEL gate 110 is operated to provide a larger floating diffusion capacitance, and the resulting reset level of the floating diffusion 50 is sampled. Charge is transferred from the photodiode 30 into the floating diffusion 50 by operating the TG gate 40. The signal resulting from the transfer of charge to the larger floating diffusions capacitance is sampled. After this third sample is taken (two reset samples and a first signal sample), the CSEL gate 110 is operated to provide a smaller floating diffusion capacitance, and the signal resulting from the application of the same charge to the smaller floating diffusion capacitance is sampled. The four samples captured, reset for the smaller and larger floating diffusion capacitances, and signal resulting from application of accumulated photodiode charge to the larger and smaller floating diffusion capacitances, provide two fully correlated results as follows: larger floating diffusion capacitance correlated signal=larger floating diffusion capacitance signal−larger floating diffusion capacitance reset; smaller floating diffusion capacitance correlated signal=smaller floating diffusion capacitance signal−smaller floating diffusion capacitance reset.

Figure 3:
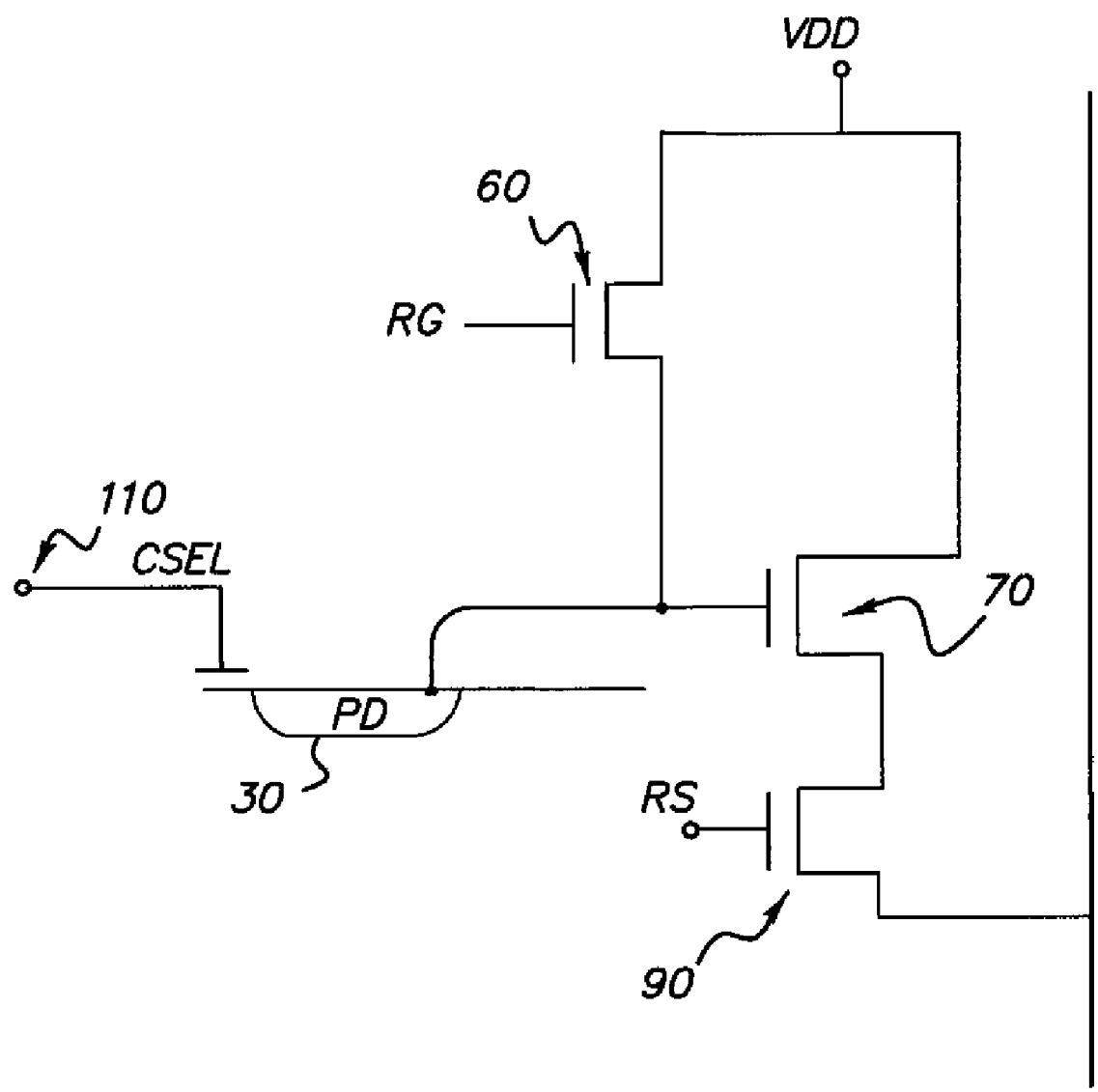
FIG. 3 is a schematic diagram of a third embodiment of the present invention.

Referring to FIG. 3, in an alternative embodiment, a three-transistor (3T) embodiment is shown. In a three transistor active pixel, it is well known that the capacitance of the photodiode 30 provides the charge-to-voltage conversion, with the integrated photodiode charge providing a voltage by means of the photodiode capacitance. Hence, compared to the 4T embodiment, the floating diffusion (FD) and transfer gate (TG) are eliminated. The voltage resulting from the integrated photodiode charge and the photodiode capacitance is applied to the gate of a transistor 70, preferably a source follower, to allow the voltage to be read out. This embodiment includes a gate (CSEL) 110 that is selectively energized to change the capacitance of the photodiode 30. As in the preferred embodiment, there is a row select transistor 90 and a reset transistor 60 which function in the same manner described hereinabove.

In the 3T embodiment, the signal from the photodiodes 30 is read out in the following manner. After integrating charge in the photodiode 30 for some period of time with the CSEL gate 110 operated to provide a larger photodiode capacitance, the voltage resulting from the integrated charge and the larger photodiode capacitance is sampled. Next, the CSEL gate 110 is operated to provide a lower photodiode capacitance, and the voltage resulting from the integrated charge and the smaller photodiode capacitance is sampled. Next, the reset transistor 60 is operated to reset the photodiode 30 by removing the integrated charge with the CSEL gate 110 operated to continue providing the smaller photodiode capacitance, the resulting reset voltage is sampled. Finally, the CSEL gate 110 is operated to provide a larger photodiode capacitance, and the resulting reset voltage is sampled. The four samples captured, signal for the smaller and larger photodiode capacitances, and reset for the larger and smaller photodiode capacitances, provide two differential results as follows: larger photodiode capacitance differential signal=larger photodiode capacitance signal−larger photodiode capacitance reset; smaller photodiode capacitance differential signal=smaller photodiode capacitance signal−smaller photodiode capacitance reset. As is well understood for the operation of a 3T pixel, the resulting differential signals cannot be regarded as fully correlated because the sampled reset level is the result of a reset operation that is different from the reset that preceded the integration and measurement of the signal. Nevertheless, the differential signal is beneficial for eliminating source follower offset which varies from pixel to pixel due to variations in threshold for the source follower transistor.

Figure 4:
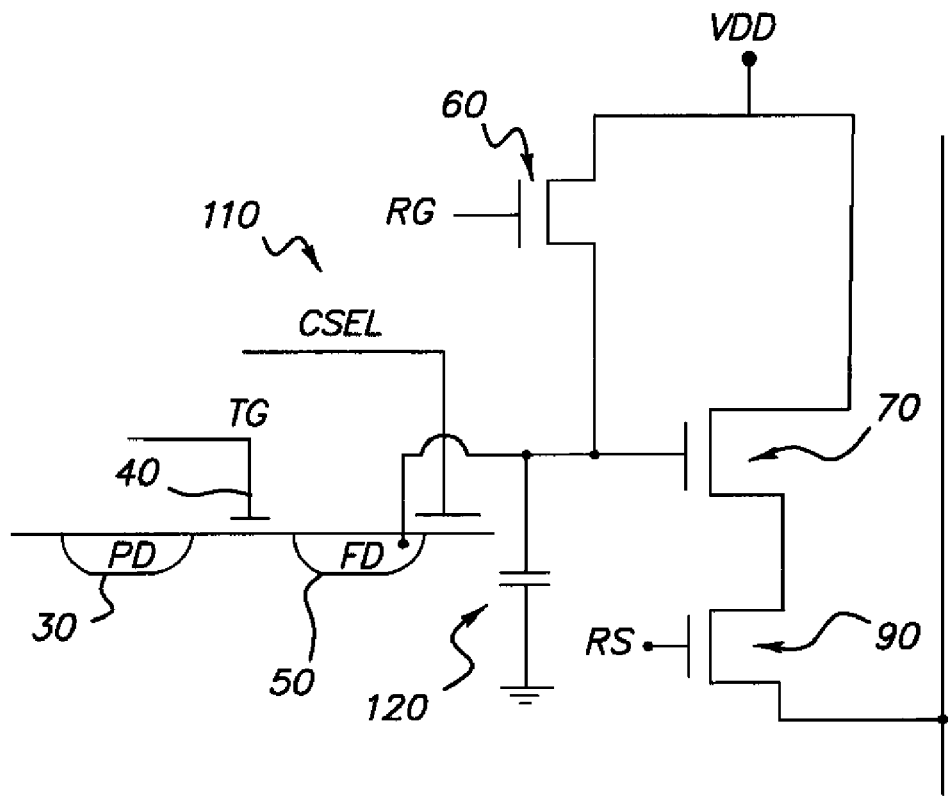
FIG. 4 is a schematic diagram of a fourth embodiment of the present invention.
Figure 5:
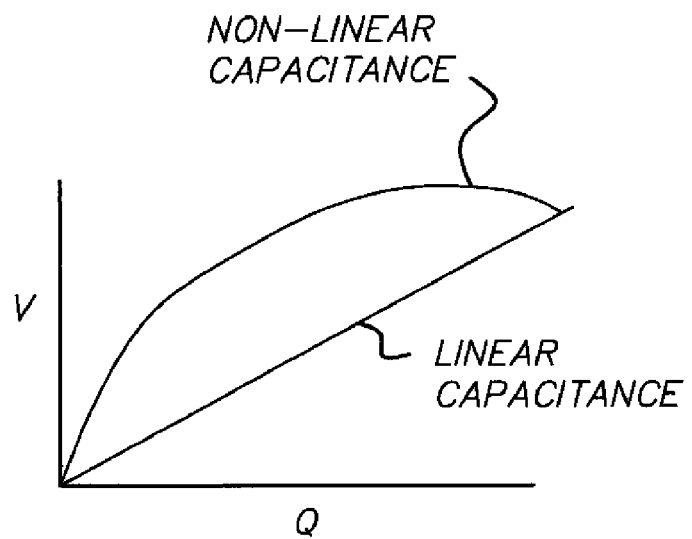
FIG. 5 is a graph depicting linear capacitance and non-linear capacitance.

Referring to FIG. 4, an alternative embodiment of the present invention, there is shown a 4T pixel structure as has previously been described having a non-linear capacitance 120 connected to the node controlling the gate of the source follower 70. FIG. 5 shows the charge-to-voltage behavior of both a linear capacitance and a non-linear capacitance. Such a non-linear capacitance may be provided by a common MOS transistor with the source, drain, and channel regions providing one plate of the capacitor and the gate providing the other. If the source, drain, and channel material are connected together and held at one potential, and the gate held at another potential that is below the threshold voltage of the transistor, a non-linear capacitance is provided. This non-linear capacitance may be employed to provide a pixel level compression operation on the signal provided by the pixel. In the non-linear capacitance shown in FIG. 5, changes in lower charge signals have relatively higher changes in voltage than higher charge signals. This pixel arrangement is operated in the commonly understood way by resetting the non-linear capacitance 120 of the source follower gate node, sampling the resulting voltage, transferring charge from the photodiode 30 to the floating diffusion 50 (and thereby to the non-linear capacitance, since the floating diffusion node is in common with the non-linear capacitance node), and sampling the new voltage.

FIG. 4 also illustrates an additional mode of operation by providing selectable additional capacitance via the CSEL control 110. The CSEL control 110 is used to change the non-linear capacitance of the source follower node. In FIG. 4, the change in capacitance is made possible by a gate adjacent to the floating diffusion 50: changing the potential of the gate changes the capacitance of the floating diffusion 50, and thereby the overall non-linear capacitance of the source follower node.

Figure 6:
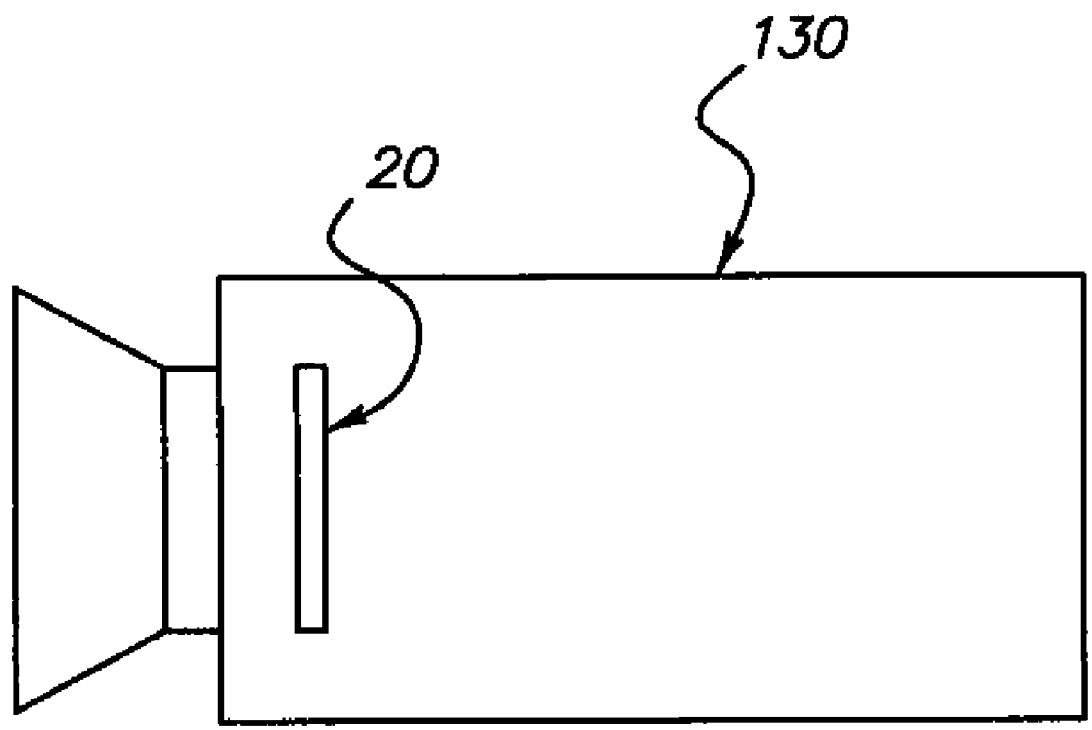
FIG. 6 is a digital camera of the present invention.

FIG. 6 is a side view of a digital camera 130 of the present invention having the image sensor 20 of the present invention.

The invention has been described with reference to a preferred embodiment. However, it will be appreciated that variations and modifications can be effected by a person of ordinary skill in the art without departing from the scope of the invention.

PARTS LIST

10 pixels
20 image sensor
30 photosensitive region
40 transfer gate
50 floating diffusion
60 reset transistor
70 amplifier
80 output bus
90 row select transistor
100 bin select transistor
105 gate
110 gate
120 non-linear capacitance
130 digital camera

The invention claimed is:

1. A method for reading out an image sensor, the method comprising:
   (a) integrating charge in a photodetector with the photodetector at a first capacitance;
   (b) reading a first resulting signal level at a first time with the photodetector at the first capacitance;

(c) changing the photodetector capacitance to a second capacitance by changing the potential on a capacitance selection gate; and (d) reading a second resulting signal level associated with the photodetector at the second capacitance.

2. The method as in claim 1 further comprising resetting the photodetector and reading a first resulting reset signal.

3. The method as in claim 2 further comprising resetting the photodetector with the photodetector at the second capacitance, reading a second resulting reset signal, changing the capacitance of the photodetector to the first capacitance, and reading a third resulting reset signal.

4. The method as in claim 2 wherein the photodetector is reset at one of the first or second capacitances, and a second reset signal is calculated based on the first reset signal and the values of the first and second capacitances.

5. The method as in claim 1 further comprising providing the second capacitance at a lower capacitance than the first capacitance.

6. A method for reading out an image sensor, the method comprising:
(a) resetting at least one charge to voltage conversion mechanism having a first capacitance and storing a first resulting reset signal;
(b) transferring charge from a photosensitive region to the at least one charge to voltage conversion mechanism having the first capacitance at a first time and storing a first resulting signal; and
(c) changing the first capacitance of at least one charge to voltage conversion mechanism to a second capacitance at a second time and storing a second resulting signal.

7. The method as in claim 6 further comprising resetting the at least one charge to voltage conversion mechanism having the second capacitance, reading a second resulting reset signal of the second capacitance, changing the second capacitance of at least one charge to voltage conversion mechanism to a first capacitance, and reading a third resulting reset signal of the first capacitance.

8. The method as in claim 6, wherein the photodetector is reset at one of the first or second capacitances, and a second reset signal is calculated based on the first reset signal and the values of the first and second capacitances.

9. The method as in claim 6 further comprising providing the second capacitance at a lower capacitance than the first capacitance.

10. The method as in claim 6 wherein changing the first capacitance of the at least one charge to voltage conversion mechanism to a second capacitance comprises selectively connecting capacitances of one or more adjacent charge to voltage conversion mechanisms.

11. A method for reading out an image sensor, the method comprising:
(a) resetting at least one charge to voltage conversion mechanism having a first capacitance and storing a first resulting reset signal;
(b) transferring charge from a photosensitive region to the at least one charge to voltage conversion mechanism having the first capacitance at a first time and storing a first resulting signal; and
(c) transferring charge from the photosensitive region to at least one charge to voltage conversion mechanism having a second capacitance at a second time and storing a second resulting signal.

12. The method as in claim 11 further comprising providing the second capacitance at a higher capacitance than the first capacitance.

13. The method as in claim 12 further comprising creating the second capacitance by selectively connecting together two or more charge-to-voltage conversion mechanisms.

14. The method as in claim 11 further comprising providing an array of pixels, wherein each pixel comprises a photosensitive region, a transfer gate, and a charge-to-voltage conversion mechanism with at least two selectable capacitances.

15. The method as in claim 11 wherein (a) is performed prior to (b) and (b) is performed prior to (c).

16. A method for reading out an image sensor, the method comprising:
(a) resetting at least one charge to voltage conversion mechanism having a first capacitance and storing a first resulting reset signal;
(b) changing the first capacitance of at least one charge to voltage conversion mechanism to a second capacitance and storing a second resulting reset signal;
(c) transferring charge from a photosensitive region to the at least one charge to voltage conversion mechanism having the second capacitance at a first time and storing a first resulting signal;
(d) changing the second capacitance of at least one charge to voltage conversion mechanism to the first capacitance; and
(e) transferring charge from the photosensitive region to the at least one charge to voltage conversion mechanism having the first capacitance at a second time and storing a second resulting signal.

17. The method as in claim 16 further comprising providing the first capacitance at a higher capacitance than the second capacitance.

18. The method as in claim 16 wherein changing the second capacitance of at least one charge to voltage conversion mechanism to the first capacitance comprises selectively connecting together two or more charge to voltage conversion mechanisms.

19. The method as in claim 16 further comprising providing an array of pixels, wherein each pixel comprises a photosensitive region, a transfer gate, and a charge-to-voltage conversion mechanism with at least two selectable capacitances.

20. The method as in claim 16 wherein (a) is performed first, (b) is performed after (a), (c) is performed after (b), (d) is performed after (c), and (e) is performed after (d).

21. The method as in claim 16 further comprising subtracting the first resulting reset signal from (a) from the second resulting signal from (e) and subtracting the second resulting reset signal from (b) from the first resulting signal from step (c).

22. A method for reading out an image sensor, the method comprising:
(a) providing a capacitance that is non-liner with respect to stored charge;
(b) resetting the non-liner capacitance and storing a resulting reset signal; and
(c) transferring charge from a photosensitive region to the capacitance and storing a resulting signal and changing the photodetector capacitance to a second capacitance by changing the potential on a capacitance selection gate.

23. The method as in claim 22 further comprising changing the non-liner capacitance by changing a potential of a gate adjacent to the non-linear capacitance.

24. A method for reading out an image sensor of a digital camera, the method comprising:
(a) integrating charge in a photodetector of the digital camera with the photodetector at a first capacitance;

(b) reading a first resulting signal level at a first time with the photodetector at the first capacitance;
(c) changing the photodetector capacitance to a second capacitance by changing the potential on a capacitance selection gate; and
(d) reading a second resulting signal level associated with the photodetector at the second capacitance.

25. The method as in claim 24 further comprising resetting the photodetector and reading a first resulting reset signal.

26. The method as in claim 25 further comprising resetting the photodetector with the photodetector at the second capacitance, reading a second resulting reset signal, changing the capacitance of the photodetector to the first capacitance, and reading a third resulting reset signal.

27. The method as in claim 25 wherein the photodetector is reset at one of the first or second capacitances, and a second reset signal is calculated based on the first reset signal and the values of the first and second capacitances.

28. The method as in claim 24 further comprising providing the second capacitance at a lower capacitance than the first capacitance.

29. The method as in claim 24 wherein the capacitance of the photodetector is changed by changing a potential of a gate adjacent the photodetector.

30. A method for reading out an image sensor of a digital camera, the method comprising:
    (a) resetting at least one charge to voltage conversion mechanism having a first capacitance and storing a first resulting reset signal;
    (b) transferring charge from a photosensitive region of the digital camera to the at least one charge to voltage conversion mechanism having the first capacitance at a first time and storing a first resulting signal; and
    (c) changing the first capacitance of at least one charge to voltage conversion mechanism to a second capacitance at a second time and storing a second resulting signal.

31. The method as in claim 30 further comprising resetting the at least one charge to voltage conversion mechanism having the second capacitance, reading a second resulting reset signal of the second capacitance, changing the second capacitance of at least one charge to voltage conversion mechanism to a first capacitance, and reading a third resulting reset signal of the first capacitance.

32. The method as in claim 30, wherein the photodetector is reset at one of the first or second capacitances, and a second reset signal is calculated based on the first reset signal and the values of the first and second capacitances.

33. The method as in claim 30 further comprising providing the second capacitance at a lower capacitance than the first capacitance.

34. The method as in claim 30 wherein changing the first capacitance of the at least one charge to voltage conversion mechanism to a second capacitance comprises selectively connecting capacitances of one or more adjacent charge to voltage conversion mechanisms.

35. A method for reading out an image sensor of a digital camera, the method comprising:
    (a) resetting at least one charge to voltage conversion mechanism having a first capacitance and storing a first resulting reset signal;
    (b) transferring charge from a photosensitive region of the digital camera to the at least one charge to voltage conversion mechanism having the first capacitance at a first time and storing a first resulting signal; and
    (c) transferring charge from the photosensitive region to the at least one charge to voltage conversion mechanism having a second capacitance at a second time and storing a second resulting signal.

36. The method as in claim 35 further comprising providing the second capacitance at a higher capacitance than the first capacitance.

37. The method as in claim 36 further comprising creating the second capacitance by selectively connecting together two or more charge-to-voltage conversion mechanisms.

38. The method as in claim 36 further comprising providing an array of pixels, wherein each pixel comprises a photosensitive region, a transfer gate, and a charge-to-voltage conversion mechanism with at least two selectable capacitances.

39. The method as in claim 35 wherein (a) is performed first, (b) is performed after (a), and (c) is performed after (b).

40. A method for reading out an image sensor of a digital camera, the method comprising:
    (a) resetting at least one charge to voltage conversion mechanism having a first capacitance and storing a first resulting reset signal;
    (b) changing the first capacitance of at least one charge to voltage conversion mechanism to a second capacitance and storing a second resulting reset signal;
    (c) transferring charge from a photosensitive region of the digital camera to the at least one charge to voltage conversion mechanism having the second capacitance at a first time and storing a first resulting signal;
    (d) changing the second capacitance of at least one charge to voltage conversion mechanism to the first capacitance; and
    (e) transferring charge from the photosensitive region to the at least one charge to voltage conversion mechanism having the first capacitance at a second time and storing a second resulting signal.

41. The method as in claim 40 further comprising providing the first capacitance at a higher capacitance than the second capacitance.

42. The method as in claim 40 wherein changing the second capacitance of at least one charge to voltage conversion mechanism to the first capacitance comprises of selectively connecting together two or more charge-to-voltage conversion mechanisms.

43. The method as in claim 40 further comprising providing an array of pixels, wherein each pixel comprises a photosensitive region, a transfer gate, and a charge-to-voltage conversion mechanism with at least two selectable capacitances.

44. The method as in claim 40 wherein (a) is performed first, (b) is performed after (a), (c) is performed after (b), (d) is performed after (c), and (e) is performed after (d).

45. The method as in claim 40 further comprising subtracting the first resulting reset signal from (a) from the second resulting signal from (e) and subtracting the second resulting reset signal from (b) from the first resulting signal from (c).

46. A method for reading out an image sensor of a digital camera, the method comprising:
    (a) providing a capacitance that is non-linear with respect to stored charge;
    (b) resetting the non-liner capacitance and storing a resulting reset signal; and
    (c) transferring charge from a photosensitive region of the image sensor to the capacitance and storing a resulting signal and changing the potential on a capacitance selection gate.

47. The method as in claim 46 further comprising changing the non-liner capacitance by changing a potential of a gate adjacent to the non-liner capacitance.

* * * * *